US012059702B2

(12) United States Patent
Ogawa et al.

(10) Patent No.: US 12,059,702 B2
(45) Date of Patent: Aug. 13, 2024

(54) COATING DEVICE, COATING METHOD, AND METHOD FOR MANUFACTURING PHOTOCONDUCTOR

(71) Applicant: FUJIFILM Business Innovation Corp., Tokyo (JP)

(72) Inventors: Hiroaki Ogawa, Kanagawa (JP); Masaru Agatsuma, Kanagawa (JP); Hiroshi Kimura, Kanagawa (JP); Akihiko Nakamura, Kanagawa (JP); Takaakira Sasaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 113 days.

(21) Appl. No.: 17/714,135

(22) Filed: Apr. 5, 2022

(65) Prior Publication Data

US 2022/0362794 A1 Nov. 17, 2022

(30) Foreign Application Priority Data

May 12, 2021 (JP) ................................ 2021-080891
Dec. 14, 2021 (JP) ................................ 2021-202691

(51) Int. Cl.
*B05C 3/20* (2006.01)
*B05D 1/18* (2006.01)
*G03G 15/00* (2006.01)

(52) U.S. Cl.
CPC .................. *B05C 3/20* (2013.01); *B05D 1/18* (2013.01); *G03G 15/751* (2013.01)

(58) Field of Classification Search
USPC .............. 118/419, 423, 413, 245; 427/430.1; 430/127
See application file for complete search history.

(56) References Cited

U.S. PATENT DOCUMENTS 5,849,454 A * 12/1998 Tada ......................... B05C 3/12 427/430.1
11,648,758 B2 * 5/2023 Nguyen ................ B32B 27/281 428/34.5

FOREIGN PATENT DOCUMENTS

JP 2004160431 A * 6/2004
JP 2007083225 4/2007
WO WO-2021106701 A1 * 6/2021 ............... B32B 1/08

OTHER PUBLICATIONS

English Translation JP2004160431 (Year: 2004).*

* cited by examiner

*Primary Examiner* — Yewebdar T Tadesse
(74) *Attorney, Agent, or Firm* — JCIPRNET

(57) ABSTRACT

A coating device includes: a coating liquid holding part provided with an upper opening portion and a lower opening portion and holding a coating liquid that is supplied from a coating liquid supply part; and an annular body that is disposed inside the coating liquid holding part, through which a cylindrical body penetrating the upper opening portion and the lower opening portion of the coating liquid holding part penetrates, and in which the coating liquid held by the coating liquid holding part flows in from an upper side and flows out from a lower side with a relative movement to the cylindrical body, the annular body being installed to be relatively displaceable along an installation surface intersecting a direction of the relative movement with respect to the coating liquid holding part.

14 Claims, 12 Drawing Sheets

COATING DEVICE, COATING METHOD, AND METHOD FOR MANUFACTURING PHOTOCONDUCTOR

CROSS-REFERENCE TO RELATED APPLICATIONS

This application is based on and claims priority under 35 USC 119 from Japanese Patent Application No. 2021-080891 filed May 12, 2021 and No. 2021-202691 filed Dec. 14, 2021.

BACKGROUND

(i) Technical Field

The present invention relates to a coating device, a coating method, and a method for manufacturing a photoconductor.

(ii) Related Art

JP2007-083225A discloses a coating device having a coating liquid holder having an upper opening portion and a lower opening portion, causing a cylindrical body to penetrate the upper opening portion and the lower opening portion, and applying a coating liquid to the outer peripheral surface of the cylindrical body by moving the cylindrical body relative to the coating liquid holder in a vertical upward direction, in which the coating liquid holder has a supply unit that supplies the coating liquid to the outer peripheral surface of the cylindrical body located below the lower opening portion in a case of causing the cylindrical body to penetrate the upper opening portion and the lower opening portion.

SUMMARY

Aspects of non-limiting embodiments of the present disclosure relate to a coating device, a coating method, and a method for manufacturing a photoconductor, in which film thickness unevenness of a coating liquid on the outer peripheral surface of a cylindrical body is suppressed compared to a case where an annular body is fixed to a coating liquid holding part.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a coating device including: a coating liquid holding part provided with an upper opening portion and a lower opening portion and holding a coating liquid that is supplied from a coating liquid supply part; and an annular body that is disposed inside the coating liquid holding part, through which a cylindrical body penetrating the upper opening portion and the lower opening portion of the coating liquid holding part penetrates, and in which the coating liquid held by the coating liquid holding part flows in from an upper side and flows out from a lower side with a relative movement to the cylindrical body, the annular body being installed to be relatively displaceable along an installation surface intersecting a direction of the relative movement with respect to the coating liquid holding part.

BRIEF DESCRIPTION OF THE DRAWINGS

Exemplary embodiment(s) of the present invention will be described in detail based on the following figures, wherein.

DETAILED DESCRIPTION

Figure 1:
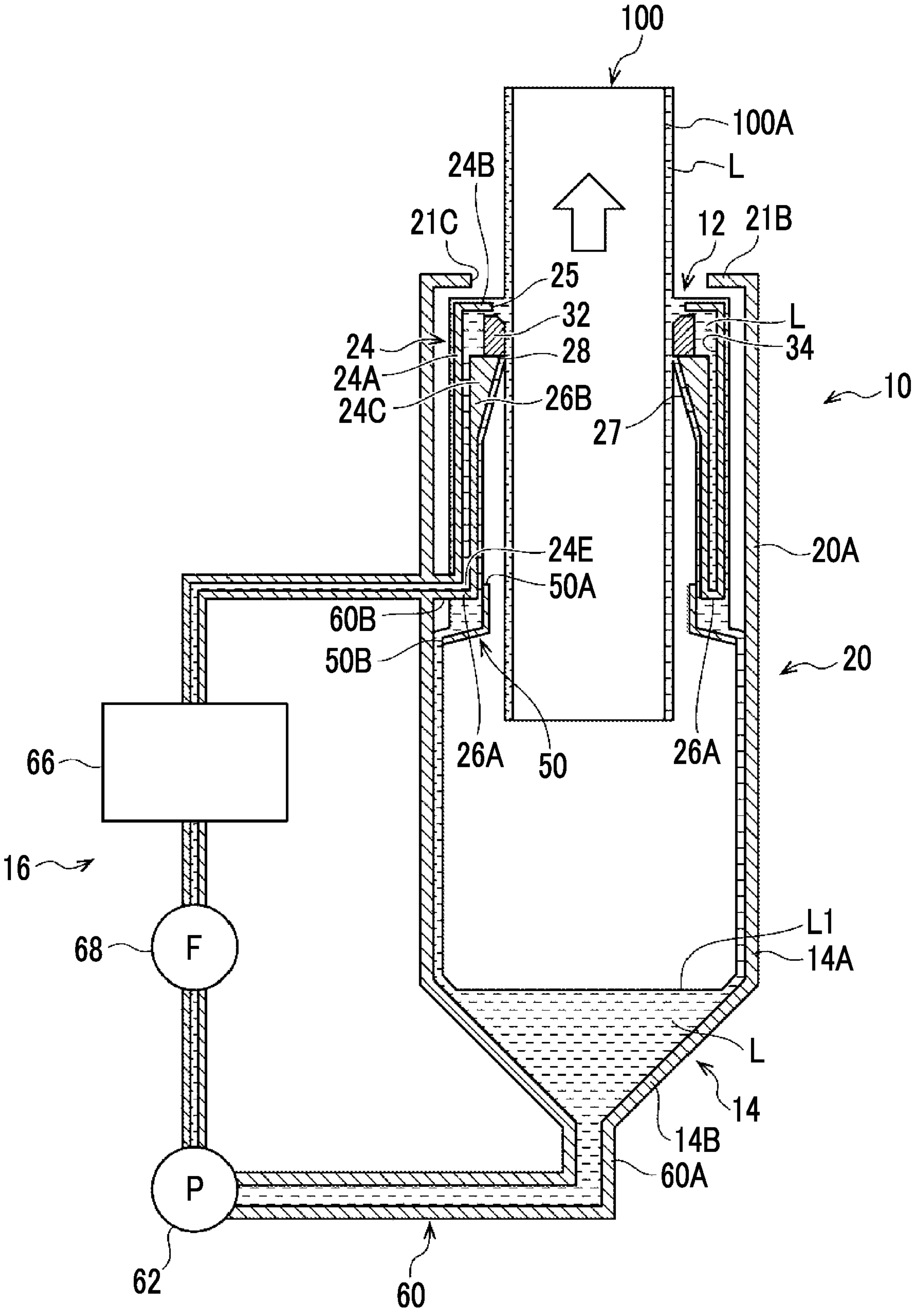
FIG. 1 is a cross-sectional view showing an outline of an overall configuration of a coating device according to a first exemplary embodiment.

Hereinafter, exemplary embodiments for carrying out the technique of the present disclosure will be described. In the following description, the direction indicated by an arrow UP appropriately shown in the drawings is defined as the upper side in an up-down direction of a device.

First Exemplary Embodiment

Overall Configuration of Coating Device

In FIG. 1, an example of a coating device 10 according to a first exemplary embodiment is shown in a cross-sectional view.

As shown in FIG. 1, the coating device 10 is a device for applying a coating liquid L to an outer peripheral surface 100A of a cylindrical body 100. The coating device 10 includes a coating liquid holding part 12 in which the coating liquid L is held, and an annular body 32 disposed inside the coating liquid holding part 12. Further, the coating device 10 includes a container 14 that accommodates the coating liquid L flowing down from the coating liquid holding part 12 side, and a circulation part 16 that circulates the coating liquid L in the container 14 to the coating liquid holding part 12. The circulation part 16 is an example of a coating liquid supply part. Further, the coating device 10 includes a tubular housing 20 that supports the coating liquid holding part 12.

Cylindrical Body

The cylindrical body 100 is, for example, a cylindrical member made of metal or a member obtained by winding an endless belt-shaped member made of metal around a cylindrical core material. The cylindrical member or the endless belt-shaped member configuring the cylindrical body 100 is, for example, a photoconductor substrate or the like for an electrophotography. Further, for example, in a case where the photoconductor substrate for an electrophotography is used as the cylindrical body 100, a liquid containing a photosensitive material, or the like, is used as the coating liquid L. In the present exemplary embodiment, the coating liquid L is applied to the cylindrical member or the endless belt-shaped member configuring the cylindrical body 100 by the coating device 10. By using the liquid containing a photosensitive material as the coating liquid L, a photoconductor for an electrophotography can be manufactured.

Housing

As shown in FIG. 1, the housing 20 is configured with a cylindrical member, and is disposed such that an axial direction of the housing 20 is in an up-down direction. As an example, for example, the housing 20 includes a cylindrical portion 20A disposed along the up-down direction.

An upper wall portion 21B extending inward in a radial direction is provided at the upper end portion of the cylindrical portion 20A, and a circular opening 21C is formed in the upper wall portion 21B. The inner diameter of the opening 21C is larger than the outer diameter of the cylindrical body 100. A configuration is made such that the cylindrical body 100 penetrates the opening 21C of the upper wall portion 21B in the axial direction.

Coating Liquid Holding Part

Figure 2:
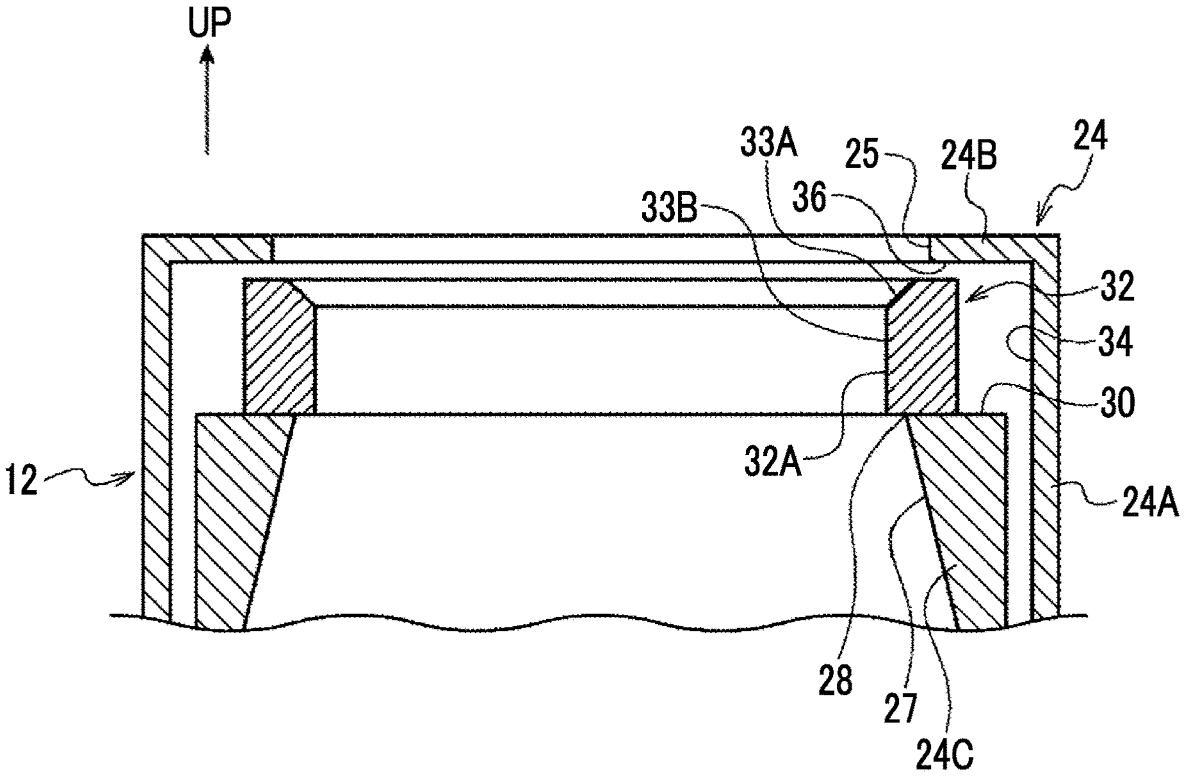
FIG. 2 is a cross-sectional view showing a part of a coating liquid holding part that is used in the coating device according to the first exemplary embodiment in an enlarged state.

As shown in FIGS. 1 and 2, the coating liquid holding part 12 has a function of holding the coating liquid L that is supplied from the circulation part 16. The coating liquid holding part 12 includes a case 24. The case 24 includes a cylindrical portion 24A, an upper wall portion 24B bent inward in the radial direction from an upper end portion of the cylindrical portion 24A, and a block portion 24C provided on the lower portion side of the cylindrical portion 24A.

An inflow port 24E into which the coating liquid L flows in is provided at the lower portion on one side in the radial direction (the right side in FIG. 1) of the cylindrical portion 24A.

An upper opening portion 25 having a circular shape is provided in the upper wall portion 24B (refer to FIG. 2). The inner diameter of the upper opening portion 25 is larger than the outer diameter of the cylindrical body 100. A configuration is made such that the cylindrical body 100 penetrates the upper opening portion 25 of the upper wall portion 24B in the axial direction.

The block portion 24C includes a bottom wall portion 26A connected to a lower end portion of the cylindrical portion 24A, and a tubular inner side wall portion 26B extending upward from the radially inner end portion of the bottom wall portion 26A (refer to FIG. 1). An inclined portion 27 disposed to have an upward slope toward the inner side in the radial direction is formed on the upper portion side of the inner side wall portion 26B. A lower opening portion 28 having a circular shape is provided in the upper end portion of the inclined portion 27 of the inner side wall portion 26B. The inner diameter of the lower opening portion 28 is larger than the outer diameter of the cylindrical body 100. Further, the inner diameter of the lower opening portion 28 is smaller than the inner diameter of the upper opening portion 25. A configuration is made such that the cylindrical body 100 penetrates the lower opening portion 28 of the block portion 24C in the axial direction.

The coating liquid holding part 12 is supported on the upper portion side in the up-down direction inside the housing 20 by a supporting portion (not shown).

The case 24 includes the cylindrical portion 24A, the upper wall portion 24B, and the block portion 24C, so that the upper side of the block portion 24C is open inward in the radial direction. An installation surface 30 on which the annular body 32 is disposed so as to be relatively displaceable is provided at the upper portion of the block portion 24C. The installation surface 30 has a function of supporting the annular body 32 so as to be relatively displaceable. The installation surface 30 has a planar shape and is disposed along the horizontal direction.

A flow path 34 through which the coating liquid L flows is provided between the cylindrical portion 24A and the block portion 24C and between the cylindrical portion 24A and the annular body 32 inside the case 24. The end portion of the flow path 34 on the upstream side in a flow direction of the coating liquid L is connected to the inflow port 24E (refer to FIG. 1).

Figures 5A, 5B, 5C:
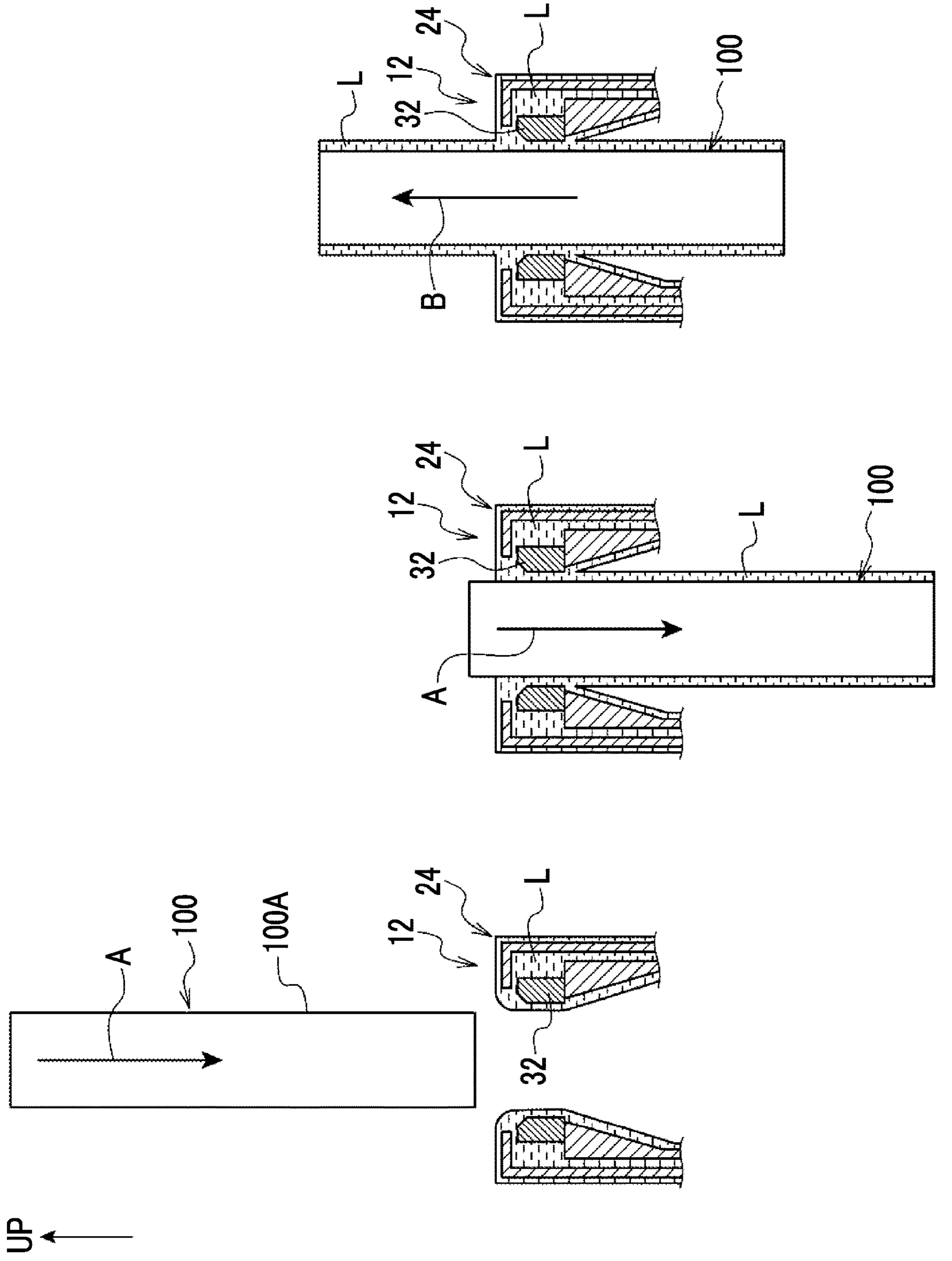
FIG. 5A is a configuration diagram showing a state before a cylindrical body is inserted into the coating liquid holding part of the coating device according to the first exemplary embodiment.
FIG. 5B is a configuration diagram showing a state where the cylindrical body is inserted into the coating liquid holding part of the coating device and lowered.
FIG. 5C is a configuration diagram showing a state where the cylindrical body is being moved upward in an up-down direction with respect to the coating liquid holding part.

The cylindrical body 100 penetrates the upper opening portion 25 and the lower opening portion 28 of the coating liquid holding part 12, and the cylindrical body 100 is configured to move relative to the coating liquid holding part 12 in the up-down direction (refer to FIGS. 5A to 5C). The installation surface 30 is disposed in a direction intersecting the direction of the relative movement of the cylindrical body 100.

Annular Body

As shown in FIGS. 1 and 2, the annular body 32 is provided in an open portion on the inner side in the radial direction of the case 24. The annular body 32 is disposed on the upper side of the installation surface 30 of the upper portion of the block portion 24C in the case 24. The annular body 32 is installed so as to be relatively displaceable along the installation surface 30 of the upper portion of the block portion 24C.

The inner diameter of the annular body 32 is larger than the outer diameter of the cylindrical body 100. A configuration is made such that the cylindrical body 100 penetrates the annular body 32 in the axial direction. That is, the cylindrical body 100 penetrating the upper opening portion 25 and the lower opening portion 28 of the coating liquid holding part 12 penetrates the annular body 32. As an example, the inner diameter of the annular body 32 is smaller than the inner diameter of the lower opening portion 28. The inner peripheral surface 32A side of the annular body 32 is exposed to a region through which the cylindrical body 100 penetrates (refer to FIG. 2). Here, the inner peripheral surface 32A is an example of the inner surface of the annular body 32.

As an example, the annular body 32 is disposed on the installation surface 30 of the upper portion of the block portion 24C in a state where the coating liquid L is interposed between the annular body 32 and the installation surface 30. The annular body 32 is made to be movable (in the present exemplary embodiment, slidable) with respect to the installation surface 30 in a state where the coating liquid L is interposed between the annular body 32 and the installation surface 30. In the present exemplary embodiment, a driving unit that directly drives the annular body 32 is not provided, and the annular body 32 is made to autonomously slide relative to the installation surface 30.

Figure 3:
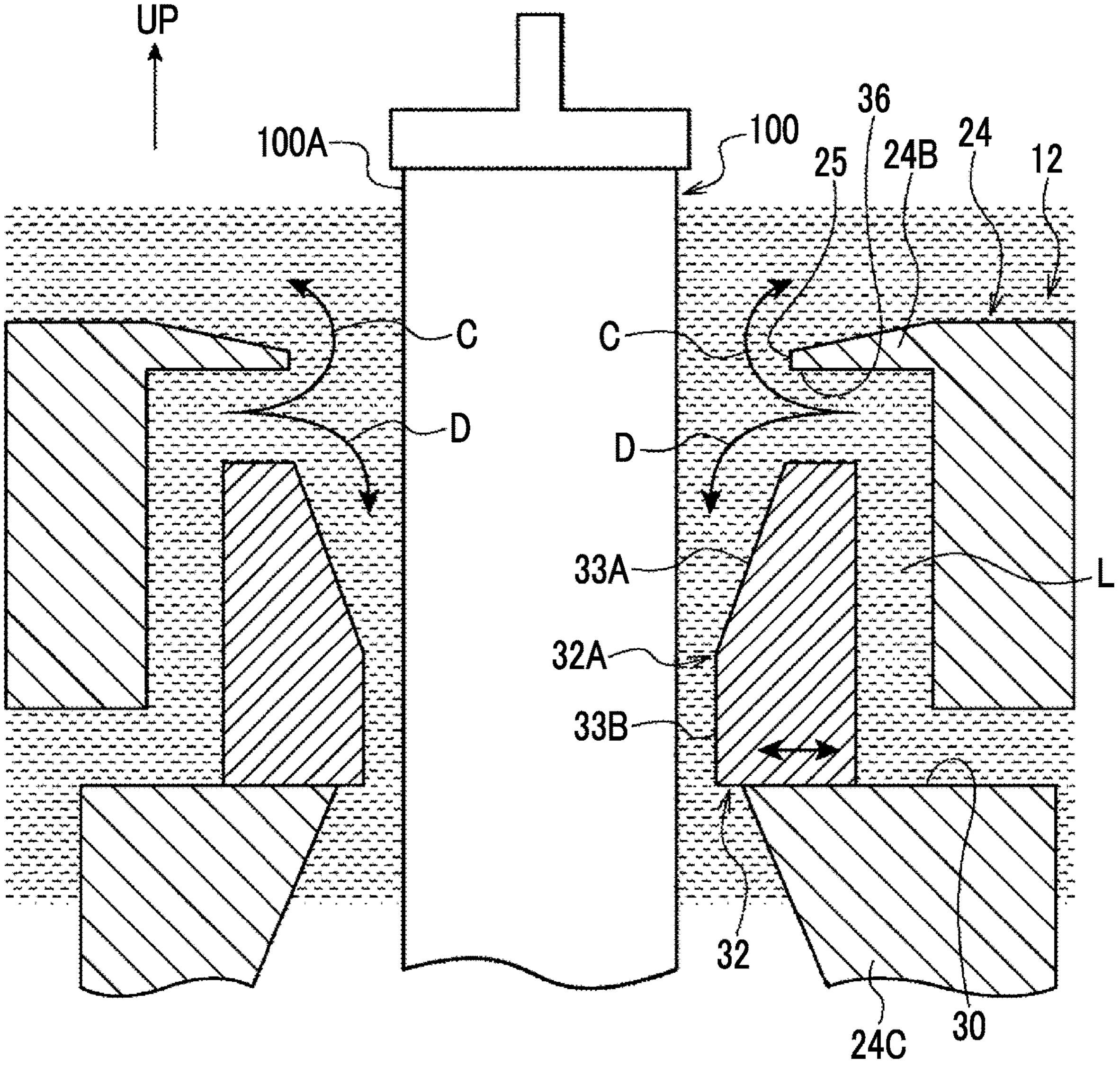
FIG. 3 is a cross-sectional view showing a flow of a coating liquid in a case where the coating liquid is applied to a cylindrical body from the coating liquid holding part that is used in the coating device according to the first exemplary embodiment.

As shown in FIGS. 2 and 3, a slit-shaped discharge portion 36 is provided along the circumferential direction between the upper opening portion 25 of the upper wall portion 24B of the coating liquid holding part 12 and the annular body 32. The coating liquid L is discharged from the discharge portion 36 (refer to FIG. 3). That is, the discharge portion 36 faces the region of the coating liquid holding part 12, through which the cylindrical body 100 penetrates, and the coating liquid L is discharged toward the cylindrical body 100 side. As shown in FIG. 3, the coating liquid L discharged from the discharge portion 36 flows from the upper opening portion 25 toward the upper surface side of the upper wall portion 24B to overflows, as shown by an arrow C, and flows downward between the annular body 32 and the outer peripheral surface 100A of the cylindrical body 100, as shown by an arrow D. That is, the annular body 32 is configured such that the coating liquid L held by the coating liquid holding part 12 flows in from the upper side and flows out from the lower side with the relative movement with the cylindrical body 100.

In the coating device 10, the coating liquid L is applied to the outer peripheral surface 100A of the cylindrical body 100 by relatively moving the cylindrical body 100 to the upper side in the up-down direction with respect to the coating liquid holding part 12 (refer to FIGS. 5B and 5C). In the coating liquid holding part 12, the coating liquid L flows between the outer peripheral surface 100A of the cylindrical body 100 and the inner peripheral surface 32A of the annular body 32, and the annular body 32 is displaced relative to the installation surface 30 by the pressure due to the flow of the coating liquid L. At this time, the annular body 32 is displaced relative to the installation surface 30 such that the gap between the outer peripheral surface 100A of the cylindrical body 100 and the inner peripheral surface 32A of the annular body 32 becomes uniform along the circumferential direction. The relative displacement of the annular body 32 with respect to the installation surface 30, that is, the principle of alignment of the annular body 32 with respect to the outer peripheral surface 100A of the cylindrical body 100 will be described in detail later.

Figure 4A:
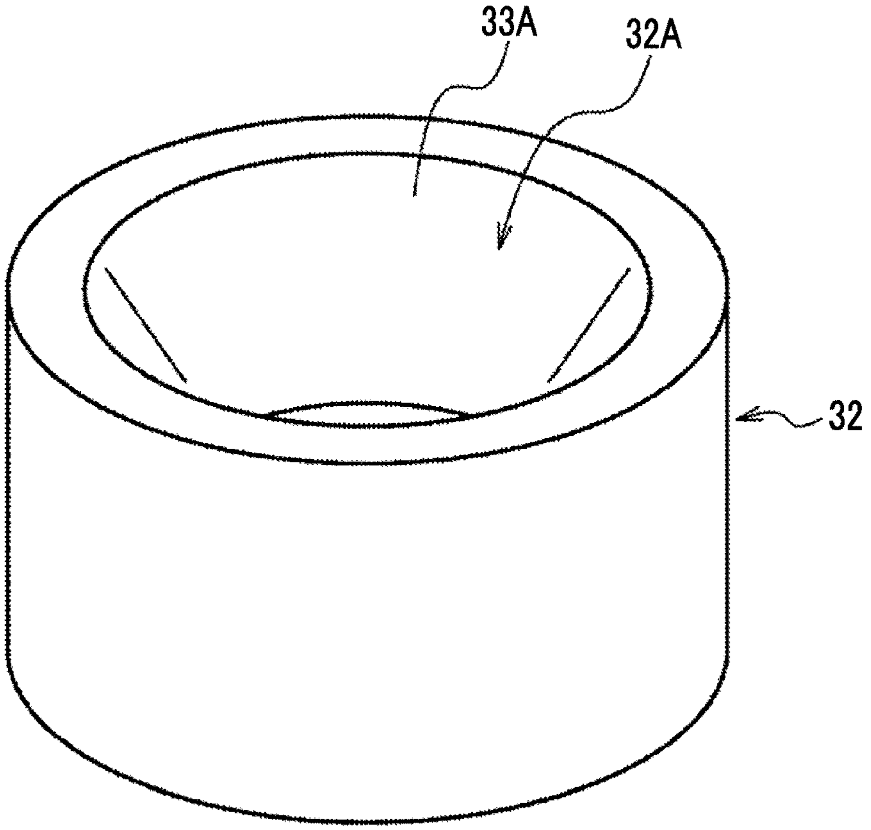
FIG. 4A is a perspective view showing an annular body that is used in the coating device according to the first exemplary embodiment.
Figure 4B:
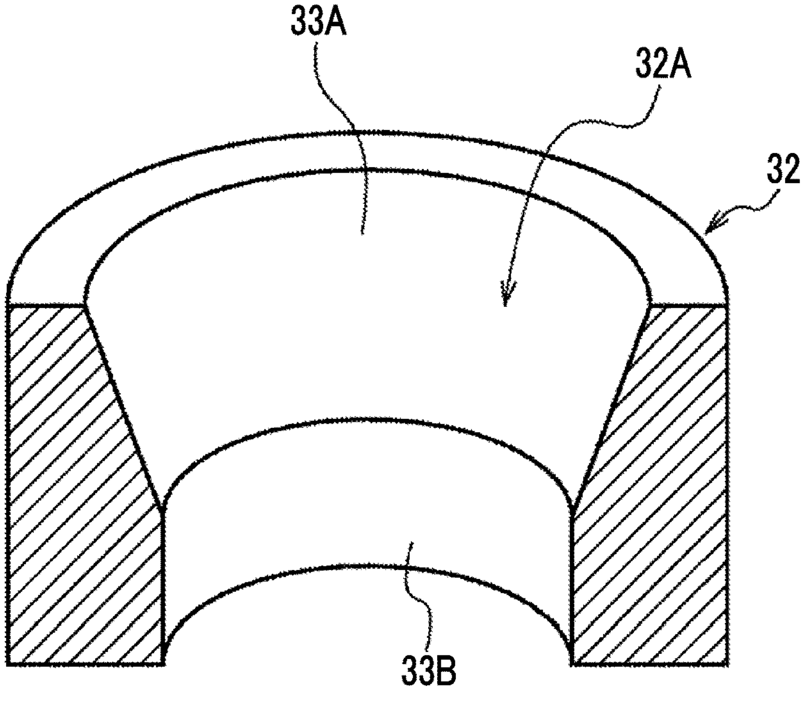
FIG. 4B is a perspective view showing the annular body in a state where a part of the annular body is cut out.

As shown in FIGS. 3 and 4, an inclined surface 33A disposed on the upper portion side and having a downward slope from the upper opening portion 25 side, and a straight portion 33B disposed straight along the up-down direction from a lower end portion of the inclined surface 33A are provided on the inner peripheral surface 32A of the annular body 32 (refer to FIG. 2).

In FIGS. 5A to 5C, an example of a method of applying the coating liquid L to the outer peripheral surface 100A of the cylindrical body 100 by the coating liquid holding part 12 of the coating device 10 is shown. As shown in FIG. 5A, the cylindrical body 100 is inserted along the axial direction from the upper side of the coating liquid holding part 12, and the cylindrical body 100 is moved downward (in a direction of an arrow A). As shown in FIG. 5B, the cylindrical body 100 is further lowered in the direction of the arrow A, and the coating liquid L is supplied to the coating liquid holding part 12 by the circulation part 16 (refer to FIG. 1), so that the coating liquid L is filled between the annular body 32 of the coating liquid holding part 12 and the outer peripheral surface 100A of the cylindrical body 100. Then, the cylindrical body 100 reaches the lowermost portion, so that the upper end portion in the axial direction of the cylindrical body 100 is disposed at a position facing the coating liquid holding part 12.

Thereafter, as shown in FIG. 5C, the cylindrical body 100 is moved upward (in a direction of an arrow B) with respect to the coating liquid holding part 12. At this time, the coating liquid L is discharged from the discharge portion 36 such that the coating liquid L overflows from the upper side of the coating liquid holding part 12. In this way, the coating liquid L flows out downward from the lower opening portion 28, and the coating liquid L is applied to the outer peripheral surface 100A of the cylindrical body 100 located above the upper opening portion 25, so that a coated film 102 is formed on the outer peripheral surface 100A of the cylindrical body 100 (refer to FIG. 6B). FIGS. 5A to 5C show an example of the method of applying the coating liquid L to the outer peripheral surface 100A of the cylindrical body 100, and the coating method can be changed.

Figure 6A:
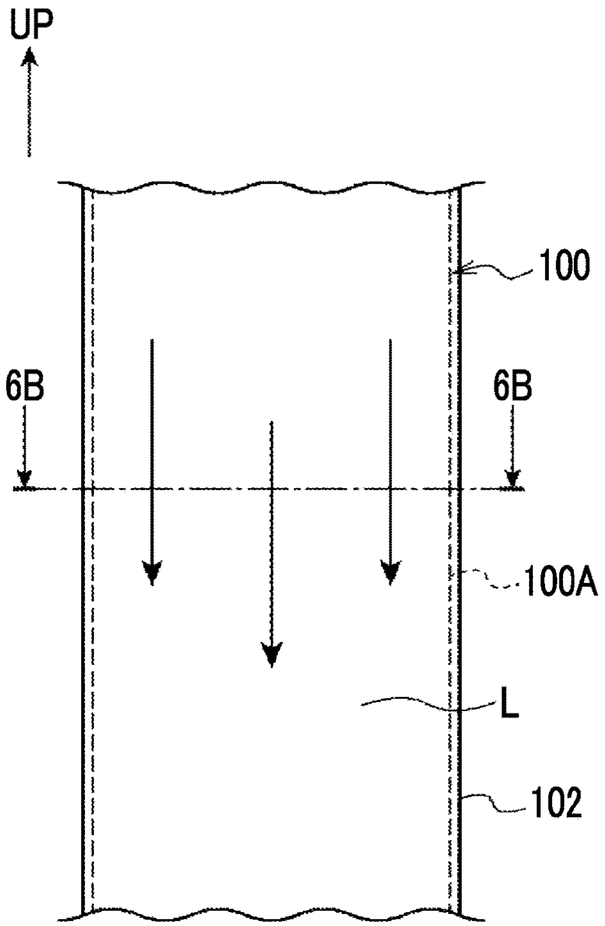
FIG. 6A is a side view showing a part of the cylindrical body in which a coated film by a coating liquid is formed on an outer peripheral surface of the cylindrical body.
Figure 6B:
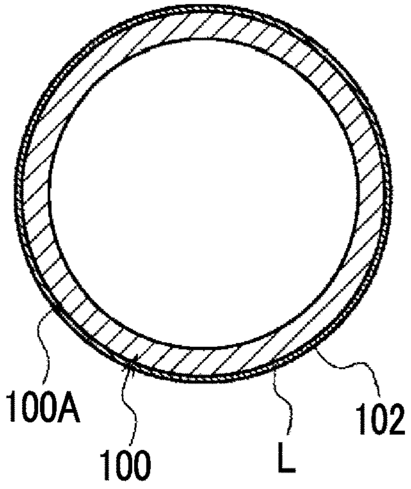
FIG. 6B is a cross-sectional view taken along line 6B-6B in FIG. 6A.

As shown in FIG. 6A, in the process in which the coating liquid L is applied to the outer peripheral surface 100A of the cylindrical body 100, the coating liquid L applied to the outer peripheral surface 100A of the cylindrical body 100 flows downward along the outer peripheral surface 100A of the cylindrical body 100.

Further, as shown in FIG. 1, in the coating device 10, a wall portion 50 is provided on the lower side of the coating liquid holding part 12 inside the housing 20. An opening portion 50A through which the cylindrical body 100 penetrates is provided at the wall portion 50. Further, a hole portion 50B disposed at a position adjacent to the inner wall surface of the housing 20 is provided at the lower end portion in the diagonal direction of the wall portion 50. In this way, the coating liquid L flows down from the hole portion 50B of the wall portion 50 along the inner wall surface of the housing 20, and the coating liquid L is collected in the container 14.

Principle of Alignment of Annular Body

Here, the principle of alignment of the annular body 32 with respect to the outer peripheral surface 100A of the cylindrical body 100 will be described.

In the steady flow of an ideal fluid, Bernoulli's theorem in which the sum of energies in a fluid is always constant on the normal line is applied. Bernoulli's theorem is expressed by Equation (1) shown in Expression 1. There are four types of fluid energy, motion, position, pressure, and internal energy, and in the case of an incompressible fluid, the internal energy can be ignored.

Expression 1

$$\rho P+\rho g\rho h+\rho U^2/2=\text{Const} \quad (1)$$

$$\rho P+\rho U^2/2=\text{Const} \quad (2)$$

$$\rho P+\rho(Q/s)^2/2=\text{Const} \quad (3)$$

U flow velocity [m/s] ρdensity [kg/$m^3$]
S flow path area [$m^2$] g gravity acceleration [m/s]
Q flow rate [$m^3$/s]=US ρP pressure change [Pa]
ρh height change [m]

The second term of Equation (1) acts equally on the inside and outside of the annular body 32, so that the second term can be ignored. Therefore, Equation (2) is obtained. Further, the flow rate Q=US is constant in a flow path. Therefore, Equation (3) is established. From the above relationships, in a case where the flow velocity U increases or the flow path area S decreases, the pressure decreases. That is, the larger the rate of change in the flow velocity or the flow path area, the greater the decrease in pressure.

Figure 7:
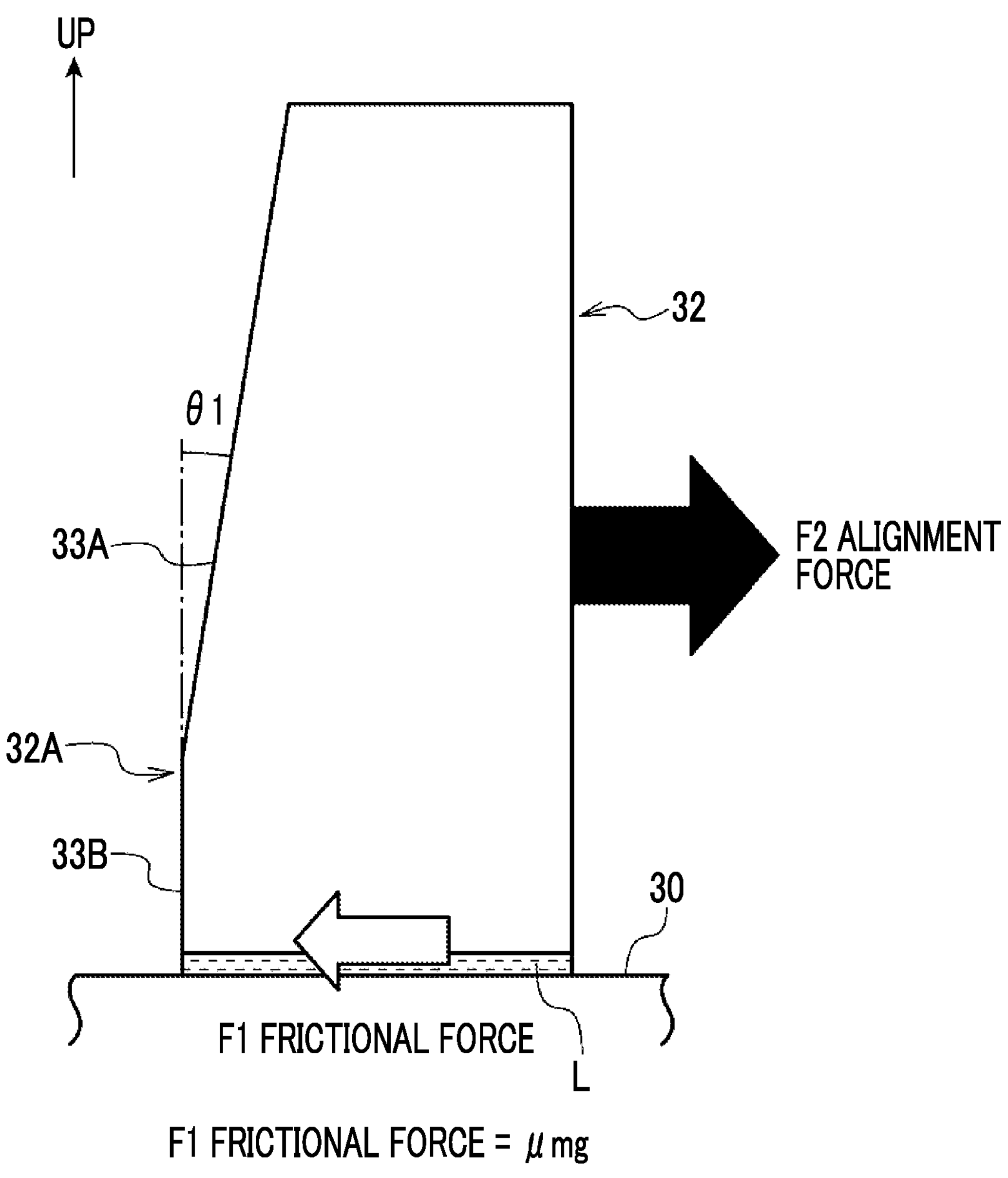
FIG. 7 is a schematic cross-sectional view showing a force acting between an annular body and an installation surface.
Figure 8:
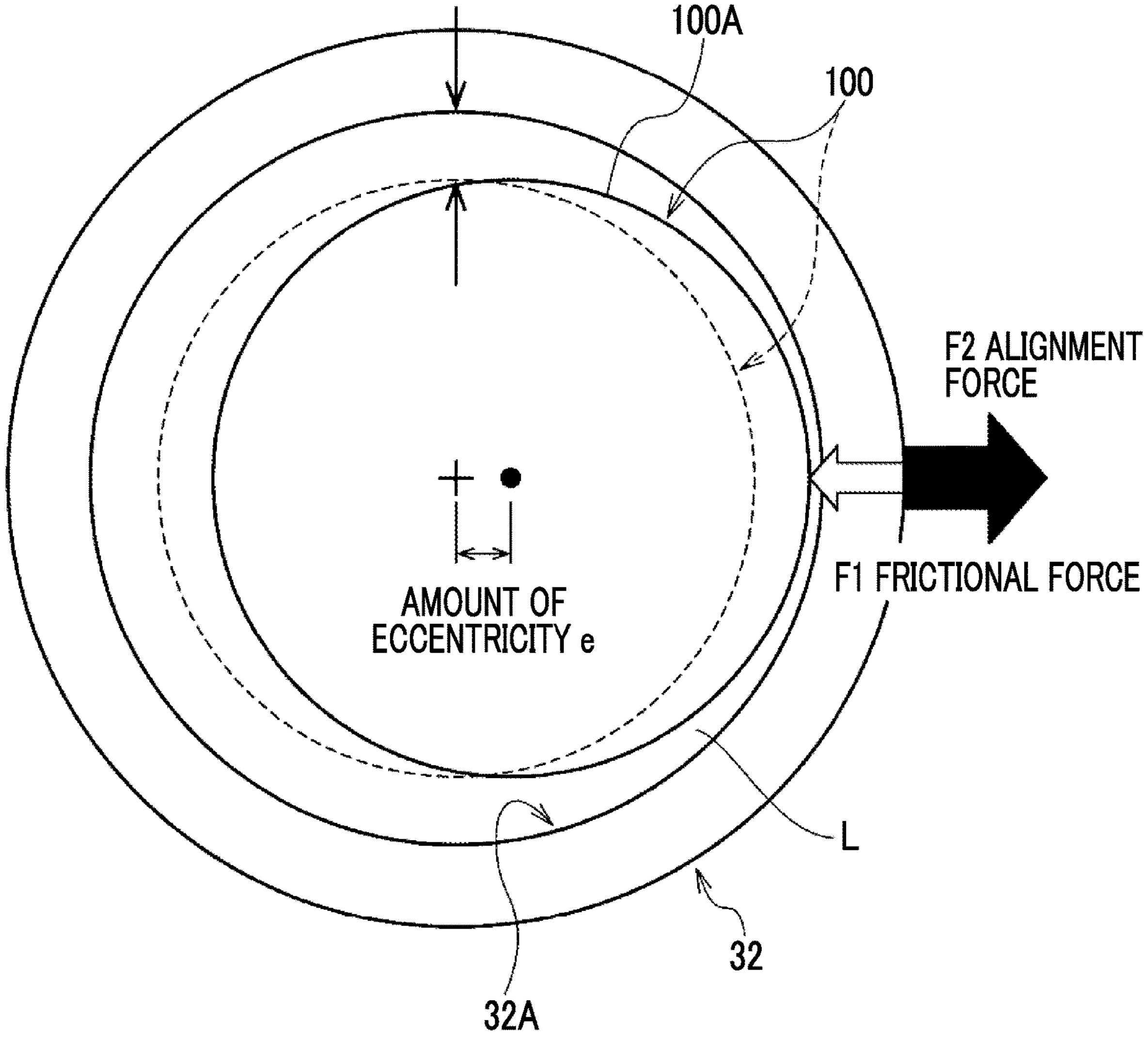
FIG. 8 is a schematic plan view showing the force acting between the annular body and the installation surface.

In FIG. 7, a part of the annular body 32 is shown, and in FIG. 8, a cross section along the direction intersecting the axial direction of the annular body 32 and the cylindrical body 100 is shown. In FIG. 3, the state of the coating liquid L flowing between the outer peripheral surface 100A of the cylindrical body 100 and the inner peripheral surface 32A of the annular body 32 is shown.

As shown in FIG. 8, in a case where the cylindrical body 100 is biased to the right side in FIG. 8 inside the annular body 32, the distance (gap) between the outer peripheral surface 100A of the cylindrical body 100 and the inner peripheral surface 32A of the annular body 32 becomes large on the left side in FIG. 8, and therefore, the flow velocity of the coating liquid L increases and the pressure decreases. In contrast, on the right side in FIG. 8, the distance (gap) between the outer peripheral surface 100A of the cylindrical body 100 and the inner peripheral surface 32A of the annular body 32 becomes small, and therefore, the flow velocity of the coating liquid L decreases and the pressure increases. That is, in a case where the distance (gap) between the outer peripheral surface 100A of the cylindrical body 100 and the inner peripheral surface 32A of the annular body 32 is biased, a pressure difference is generated according to Bernoulli's theorem. Therefore, as shown in FIGS. 7 and 8, an alignment force (F2) of the annular body 32 that tries to keep the distance (gap) between the outer peripheral surface 100A of the cylindrical body 100 and the inner peripheral surface 32A of the annular body 32 uniform is generated.

As shown in FIGS. 7 and 8, the operating condition of the annular body 32 with respect to the installation surface is alignment force (F2)>frictional force (F1). Therefore, in order to maximize the alignment force (F2), the angle θ1 of the inclined surface 33A of the annular body 32 with respect to the vertical direction is adjusted, or the distance (gap) between the cylindrical body 100 and the annular body 32 is increased within a range in which the overflow of the coating liquid L toward the upper side of the upper wall portion 24B is established. Further, in order to minimize the frictional force (F1), the weight of the annular body 32 is reduced, or the coefficient of static friction between the annular body 32 and the installation surface 30 is reduced.

The annular body 32 is made of metal, for example. In order to reduce the weight of the annular body 32, for example, polyethylene (PE) resin or the like is used. Further, for example, SUS or the like is used for the block portion 24C provided with the installation surface 30. The installation surface 30 is preferably, for example, be subjected to polishing or coating treatment in order to reduce the frictional resistance with respect to the annular body 32.

The angle θ1 of the inclined surface 33A of the annular body 32 with respect to the vertical direction is preferably 2° or larger and 20° or smaller, more preferably 5° or larger and 18° or smaller, and further preferably 7° or larger and 15° or smaller, for example. As an example, the angle θ1 of the inclined surface 33A of the annular body 32 with respect to the vertical direction is 7°.

Further, the coefficient of static friction between the annular body 32 and the installation surface 30 is preferably 0.2 or less, more preferably 0.08 or less, and further preferably 0.05 or less, for example. As an example, the coefficient of static friction between the annular body 32 and the installation surface 30 is set to 0.08.

Figure 9:
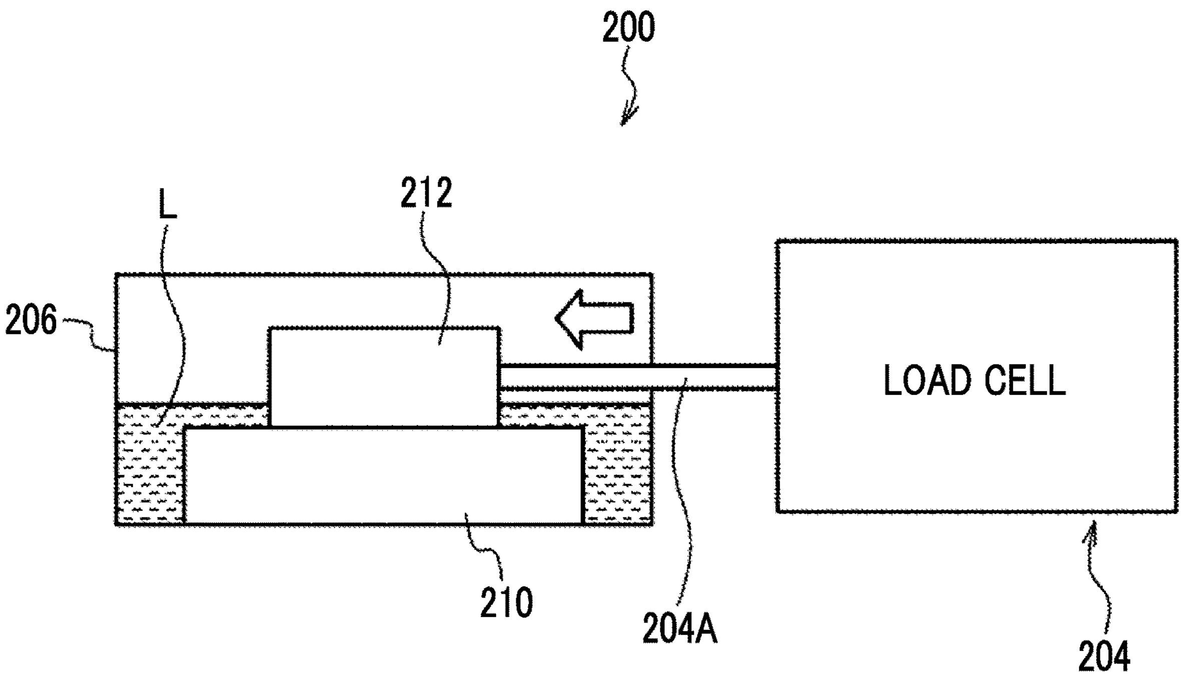
FIG. 9 is a configuration diagram showing a measurement device for measuring a coefficient of static friction between the annular body and the installation surface.

In FIG. 9, a measurement device 200 for measuring the coefficient of static friction between the annular body 32 and the installation surface 30 is shown. As shown in FIG. 9, the measurement device 200 includes a load cell 204 and a container 206 in which the coating liquid L is accommodated. A first test piece 210 as a supporting table assuming the installation surface 30 and a second test piece 212 assuming the annular body 32 on the first test piece 210 are disposed inside the container 206. Although not shown in the drawing, the load cell 204 includes a strain generating body that is deformed in proportion to a force, and a strain gauge that measures the amount of deformation of the strain generating body. A rod 204A of the load cell 204 is in contact with the second test piece 212.

The first test piece 210 is formed of the same material as the installation surface 30, and is formed of, for example, SUS. The upper surface of the first test piece 210 is subjected to polishing or coating treatment, similar to the installation surface 30. Further, the second test piece 212 is formed of the same material as the annular body 32, and is formed of, for example, polyethylene (PE).

In the measurement device 200, the coefficient of static friction is measured by Expression 2 below. Here, F is a frictional force, N is a normal force acting on a contact surface, and p is the coefficient of static friction.

Expression 2

$$F=\mu N_{(Mg)} \quad (1)$$

Container

As shown in FIG. 1, the container 14 is provided at the lower portion in the up-down direction of the housing 20. As an example, the container 14 is connected to the lower end portion of the cylindrical portion 20A of the housing 20.

The container 14 includes a cylindrical portion 14A connected to the cylindrical portion 20A, and a recess portion 14B disposed at the lower portion of the cylindrical portion 14A and having a valley-shaped bottom surface. In the present exemplary embodiment, the bottom surface of the recess portion 14B has an inverted conical shape in which the inner diameter gradually decreases toward the lower side.

The recess portion 14B has a bottom surface inclined to have a downward slope from the cylindrical portion 14A side toward the central portion in the radial direction, and the central portion of the recess portion 14B is the lowermost portion. The coating liquid L flowing down from the coating liquid holding part 12 side is collected in the recess portion 14B of the container 14. As an example, a liquid level L1 of the coating liquid L is located on the upper portion side of the recess portion 14B.

Circulation Part

As shown in FIG. 1, the circulation part 16 includes a supply pipe 60 for supplying the coating liquid L in the container 14 to the coating liquid holding part 12, and a pump 62 provided in the middle of the supply pipe 60. The pump 62 transfers the coating liquid L in the supply pipe 60 from the container 14 side to the coating liquid holding part 12 side.

An upstream-side end portion 60A in the flow direction of the coating liquid L of the supply pipe 60 is connected to the lower portion of the container 14. In the present exemplary embodiment, the upstream-side end portion 60A of the supply pipe 60 is connected to the central portion which is the lowermost portion of the recess portion 14B. Further, a downstream-side end portion 60B in the flow direction of the coating liquid L of the supply pipe 60 penetrates the housing 20 and is connected to the inflow port 24E of the coating liquid holding part 12. In this way, the coating liquid L flowing through the supply pipe 60 is supplied to the flow path 34 from the inflow port 24E. There is a case where the upstream side or the downstream side in the flow direction of the coating liquid L is simply referred to as the "upstream side" or the "downstream side" with the expression "the flow direction of the coating liquid L" omitted.

Further, a viscosity measuring unit 66 that measures the viscosity of the coating liquid L is provided on the downstream side of the pump 62 in the flow direction of the coating liquid L in the middle of the supply pipe 60. Further, a filter 68 for removing foreign matter contained in the coating liquid L is provided on the upstream side of the viscosity measuring unit 66 in the flow direction of the coating liquid L in the middle of the supply pipe 60.

In the coating device 10, the coating liquid L in the container 14 is supplied to the coating liquid holding part 12 through the supply pipe 60 by driving the pump 62 of the circulation part 16. In the coating liquid holding part 12, the coating liquid L is applied to the outer peripheral surface 100A of the cylindrical body 100, and the coating liquid L flowing down along the outer peripheral surface 100A of the cylindrical body 100 is collected in the container 14. Then, the coating liquid L in the container 14 is supplied to the coating liquid holding part 12 through the supply pipe 60. Therefore, the coating liquid L in the container 14 is circulated to the coating liquid holding part 12 by the circulation part 16.

Operation and Effect

Next, the operation and effect of the present exemplary embodiment will be described.

The coating device 10 includes the coating liquid holding part 12 which is provided with the upper opening portion 25 and the lower opening portion 28 and holds the coating liquid L. In the coating liquid holding part 12, the cylindrical body 100 penetrates the upper opening portion 25 and the lower opening portion 28, and the cylindrical body 100 is relatively moved upward in the up-down direction, so that the coating liquid L is applied to the outer peripheral surface 100A of the cylindrical body 100.

More specifically, as shown in FIG. 5A, the cylindrical body 100 is inserted in the direction of the arrow A from the upper side of the coating liquid holding part 12. As shown in FIG. 5B, the cylindrical body 100 is lowered in the direction of the arrow A, and the coating liquid L is supplied to the coating liquid holding part 12 by the circulation part 16 (refer to FIG. 1), so that the coating liquid L is filled between the annular body 32 of the coating liquid holding part 12 and the outer peripheral surface 100A of the cylindrical body 100. Then, the cylindrical body 100 reaches the lowermost portion.

Thereafter, as shown in FIG. 5C, the cylindrical body 100 is moved upward (in the direction of the arrow B) with respect to the coating liquid holding part 12, and the coating liquid L is discharged from the discharge portion 36 such that the coating liquid L overflows from the upper side. In this way, the coating liquid L flows out downward from the lower opening portion 28, and the coating liquid L is applied to the outer peripheral surface 100A of the cylindrical body 100 located above the upper opening portion 25. In this way, the coated film 102 is formed on the outer peripheral surface 100A of the cylindrical body 100 (refer to FIG. 6B).

In the coating device 10 of the present exemplary embodiment, the annular body 32 is disposed inside the coating liquid holding part 12, and the cylindrical body 100 penetrating the upper opening portion 25 and the lower opening portion 28 of the coating liquid holding part 12 penetrates the annular body 32. Then, the coating liquid L held by the coating liquid holding part 12 flows in from the upper side and flows out from the lower side between the annular body 32 and the cylindrical body 100 with the relative movement of the cylindrical body 100 with respect to the coating liquid holding part 12. The annular body 32 is installed so as to be relatively displaceable along the installation surface 30 that intersects the direction of the relative movement of the cylindrical body 100 with respect to the coating liquid holding part 12. At that time, in a case where the distance (gap) between the outer peripheral surface 100A of the cylindrical body 100 and the inner peripheral surface 32A of the annular body 32 is biased, a pressure difference is generated according to Bernoulli's theorem. Therefore, the alignment force F2 of the annular body 32 that tries to keep the distance between the outer peripheral surface 100A of the cylindrical body 100 and the inner peripheral surface 32A of the annular body 32 uniform is generated. Therefore, the distance between the outer peripheral surface 100A of the cylindrical body 100 and the inner peripheral surface 32A of the annular body 32 becomes uniform along the circumferential direction.

The coating device 10 is provided with the container 14 that accommodates the coating liquid L flowing down from the coating liquid holding part 12 side. In this way, the coating liquid L flowing downward along the outer peripheral surface 100A of the cylindrical body 100 flows down, and the coating liquid L is collected in the container 14 (refer to FIG. 3).

Further, the coating device 10 includes the circulation part 16 that circulates the coating liquid L in the container 14 to the coating liquid holding part 12. In the circulation part 16, the coating liquid L in the container 14 is supplied to the coating liquid holding part 12 through the supply pipe 60 by driving the pump 62.

In the coating device 10 described above, the annular body 32 is installed so as to be relatively displaceable along the installation surface 30 that intersects the direction of the relative movement of the cylindrical body 100 with respect to the coating liquid holding part 12. Therefore, in the coating device 10, the film thickness unevenness of the coating liquid L (the film thickness unevenness of the coated film 102) on the outer peripheral surface 100A of the cylindrical body 100 is suppressed compared to a case where the annular body is fixed to the coating liquid holding part.

Further, in the coating device 10, the coefficient of static friction between the annular body 32 and the installation surface 30 is 0.2 or less. In this way, the annular body 32 is easily relatively displaced along the installation surface 30, compared to a case where the coefficient of static friction between the annular body 32 and the installation surface 30 is larger than 0.2. In this way, the distance between the inner peripheral surface 32A of the annular body 32 and the outer peripheral surface 100A of the cylindrical body 100 is easily uniformly maintained. Therefore, in the coating device 10, the film thickness unevenness of the coating liquid L (the film thickness unevenness of the coated film 102) on the outer peripheral surface 100A of the cylindrical body 100 is suppressed compared to a case where the coefficient of static friction between the annular body and the installation surface is larger than 0.2.

Further, in the coating device 10, the coefficient of static friction between the annular body 32 and the installation surface 30 is 0.08 or less. In this way, the annular body 32 is easily relatively displaced along the installation surface 30, and the distance between the inner peripheral surface 32A of the annular body 32 and the outer peripheral surface 100A of the cylindrical body 100 is easily uniformly maintained. Therefore, in the coating device 10, the film thickness unevenness of the coating liquid L (the film thickness unevenness of the coated film 102) on the outer peripheral surface 100A of the cylindrical body 100 is suppressed compared to a case where the coefficient of static friction between the annular body and the installation surface is larger than 0.08.

Further, in the coating device 10, the inclined surface 33A having a downward slope from the position where the coating liquid L held by the coating liquid holding part 12 flows in is provided on the inner peripheral surface 32A of the annular body 32. In this way, the coating liquid L easily flows in the inclined surface 33A of the annular body 32 and the outer peripheral surface 100A of the cylindrical body 100, and easily flows between the annular body 32 and the outer peripheral surface 100A of the cylindrical body 100. Therefore, in the coating device 10, the film thickness unevenness of the coating liquid L (the film thickness unevenness of the coated film 102) on the outer peripheral surface 100A of the cylindrical body 100 is suppressed compared to a case where the inner surface of the annular body is disposed straight along the up-down direction from the position where the coating liquid flows in.

Further, in the coating device 10, the angle θ1 of the inclined surface 33A with respect to the vertical direction is 2° or larger and 20° or smaller. Therefore, in the coating device 10, the film thickness unevenness of the coating liquid L (the film thickness unevenness of the coated film 102) on the outer peripheral surface 100A of the cylindrical body 100 is suppressed compared to a case where the angle of the inclined surface with respect to the vertical direction is smaller than 2°. Further, the height of the annular body 32 can be lowered (that is, the length in the up-down direction of the annular body 32 can be shortened) compared to a case where the angle of the inclined surface with respect to the vertical direction is larger than 20°, and thus the annular body 32 can be downsized.

Further, the coating method of applying the coating liquid by using the coating device 10 includes causing the cylindrical body 100 to penetrate the upper opening portion 25 and the lower opening portion 28 of the coating liquid holding part 12 and penetrate the annular body 32, and disposing the upper portion of the cylindrical body 100 at a position facing the coating liquid holding part 12. Further, the coating method includes supplying the coating liquid L from the circulation part 16 to the coating liquid holding part 12. Further, the coating method includes relatively moving the cylindrical body 100 upward in the up-down direction with respect to the coating liquid holding part 12, and causing the coating liquid L held by the coating liquid holding part 12 to flows in from the upper side and flow out from the lower side between the annular body 32 and the cylindrical body 100. In this way, the annular body 32 is relatively displaced along the installation surface 30.

Therefore, according to the coating method described above, the film thickness unevenness of the coating liquid L (the film thickness unevenness of the coated film 102) on the outer peripheral surface 100A of the cylindrical body 100 is suppressed compared to a case where the annular body is fixed inside the coating liquid holding part.

Further, in the coating method of applying the coating liquid by using the coating device 10, the cylindrical body 100 is a cylindrical member or a member obtained by winding an endless belt-shaped member around a cylindrical core material. Therefore, in the coating method, the film thickness unevenness of the coating liquid L (the film thickness unevenness of the coated film 102) on the outer peripheral surface 100A of the cylindrical member or the endless belt-shaped member is suppressed compared to a case where the annular body is fixed inside the coating liquid holding part.

Further, in a method for manufacturing a photoconductor by using the coating method described above, the cylindrical body 100 is a cylindrical member made of metal or a member obtained by winding an endless belt-shaped member made of metal around a cylindrical core material, and the coating liquid L contains a photosensitive material. Therefore, in the method for manufacturing a photoconductor, in a case where the coating liquid is applied to the outer peripheral surface of the photoconductor, the film thickness unevenness of the coating liquid L (the film thickness unevenness of the coated film 102) is suppressed compared to a case where the annular body is fixed inside the coating liquid holding part.

Second Exemplary Embodiment

Next, a coating device 120 of a second exemplary embodiment will be described using FIGS. 10 to 13A and 13B. The identical components to the configurations of the first exemplary embodiment described above will be denoted the identical reference numerals and the description thereof will be omitted.

Figure 10:
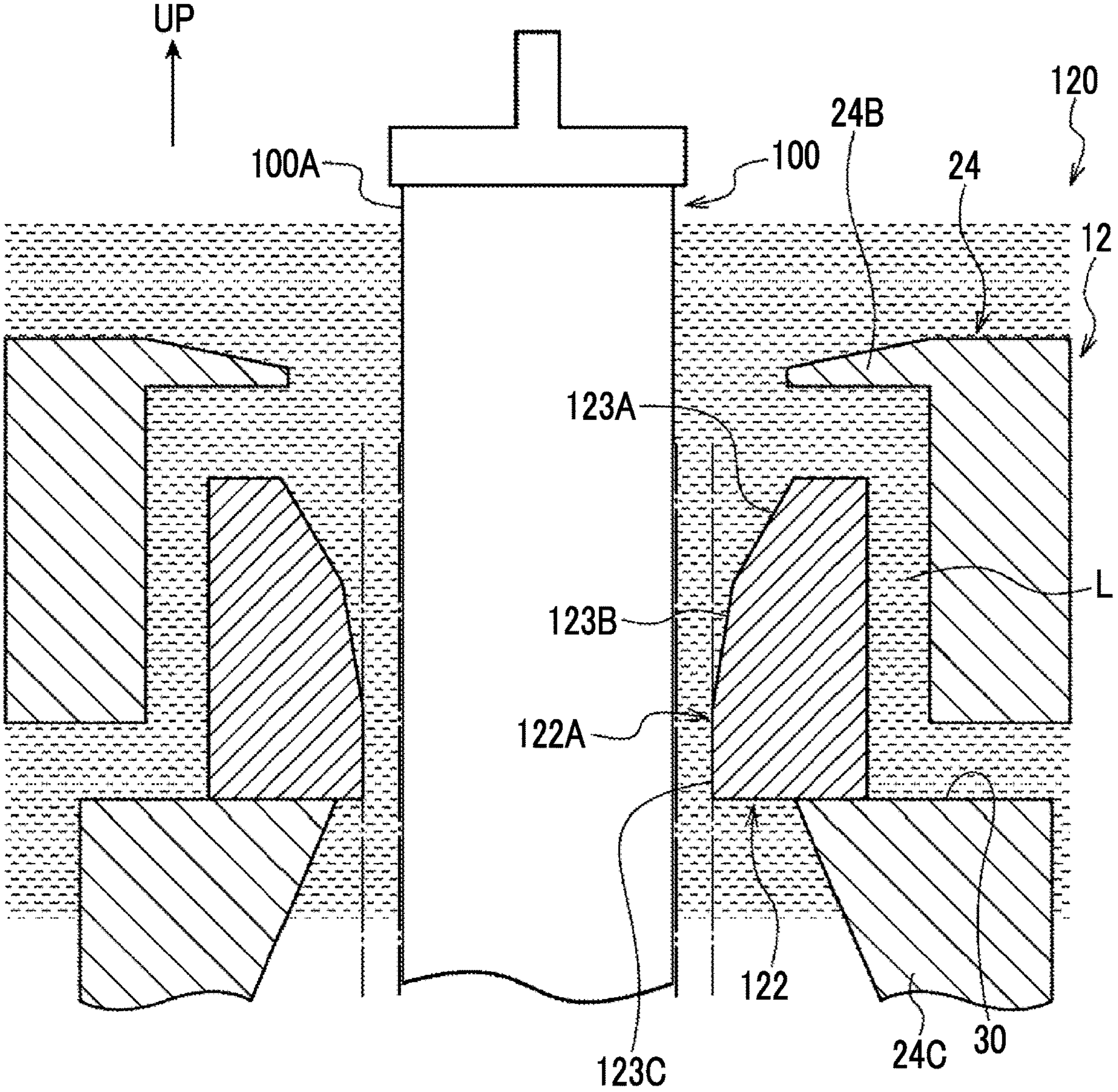
FIG. 10 is a cross-sectional view showing a configuration in the vicinity of an annular body that is used in a coating device according to a second exemplary embodiment.

As shown in FIG. 10, the coating device 120 includes an annular body 122 instead of the annular body 32 of the coating device 10 of the first exemplary embodiment. The inner diameter of an inner peripheral surface 122A of the annular body 122 is larger than the outer diameter of the cylindrical body 100, and the cylindrical body 100 can penetrate the inside of the annular body 122. The inner peripheral surface 122A is an example of the inner surface.

Figure 11:
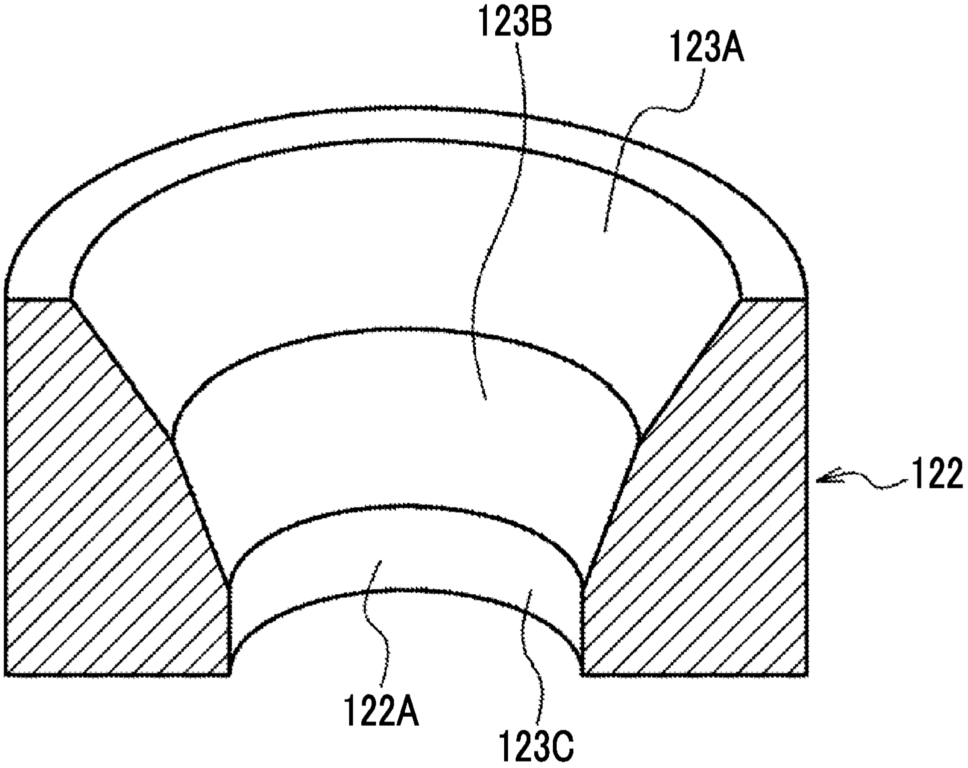
FIG. 11 is a perspective view showing the annular body in a state where a part of the annular body that is used in the coating device according to the second exemplary embodiment is cut out.
Figure 12:
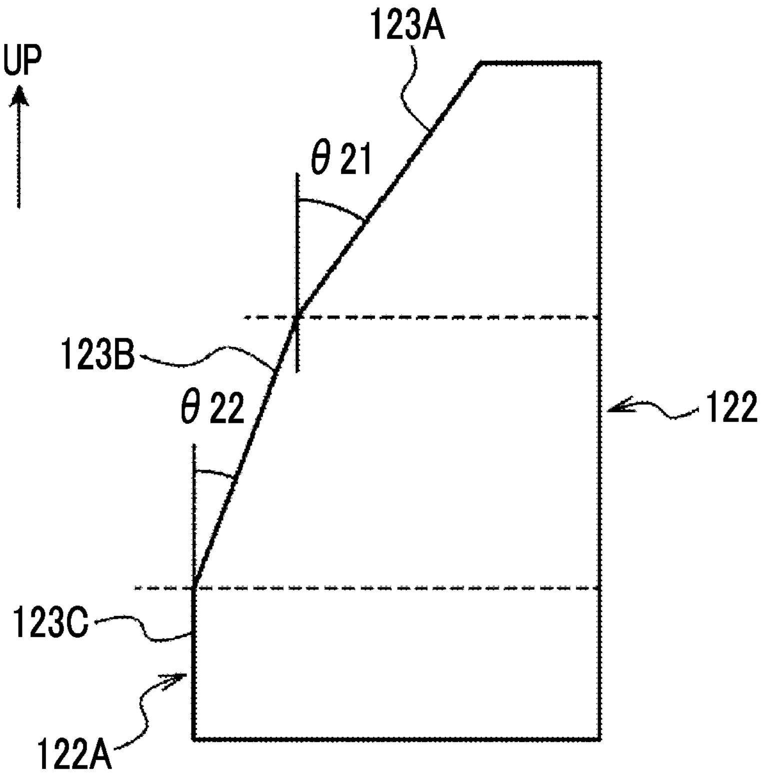
FIG. 12 is a cross-sectional view showing a part of the annular body that is used in the coating device according to the second exemplary embodiment.

As shown in FIGS. 10 to 12, a plurality of stages (in the present exemplary embodiment, two stages) of inclined surfaces having different angles with respect to the vertical direction are formed on the inner peripheral surface 122A of the annular body 122. In the present exemplary embodiment, a first inclined surface 123A disposed on the upper portion side of the annular body 122 and having a first inclination angle θ21 with respect to the vertical direction is provided on the inner peripheral surface 122A of the annular body 122 (refer to FIG. 12). Further, a second inclined surface 123B disposed on the lower side of the first inclined surface 123A and having a second inclination angle θ22 different from the first inclination angle θ21 with respect to the vertical direction is provided on the inner peripheral surface 122A of the annular body 122. The upper end portion of the second inclined surface 123B is connected to the lower end portion of the first inclined surface 123A. Further, a straight portion 123C disposed along the up-down direction from the lower end portion of the second inclined surface 123B is provided on the inner peripheral surface 122A of the annular body 122.

Figure 13A:
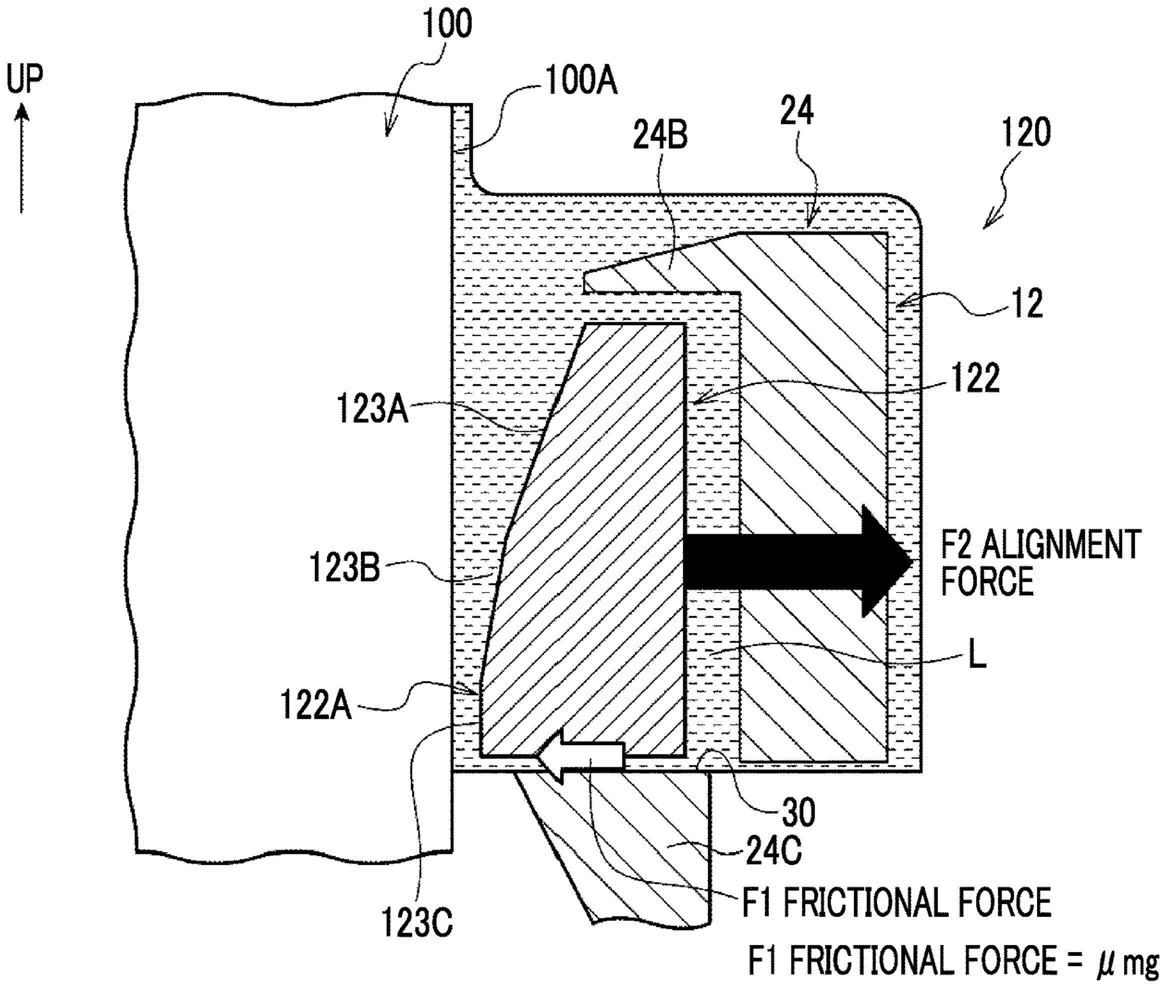
FIG. 13A is a schematic cross-sectional view showing a force acting between the annular body and the installation surface.
Figure 13B:
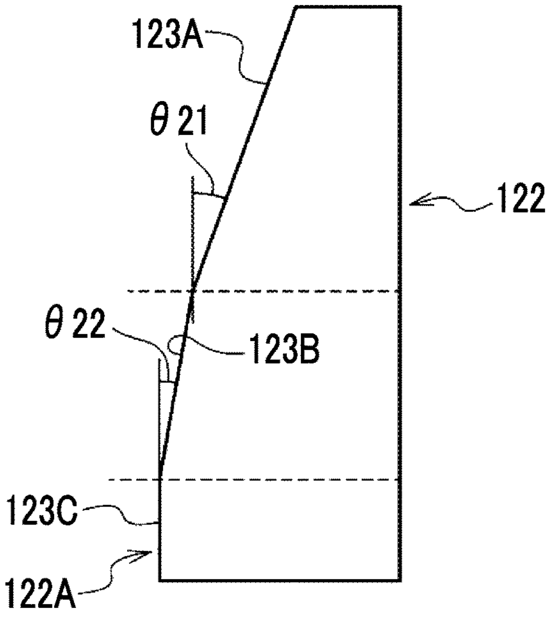
FIG. 13B is a cross-sectional view showing an example of an angle of each of a first inclined surface and a second inclined surface of the annular body with respect to a vertical direction.

As shown in FIG. 13A, the operating condition of the annular body 122 with respect to the installation surface 30 is alignment force (F2)>frictional force (F1). The coating liquid L is interposed between the installation surface 30 and the annular body 122. In order to satisfy the operating condition as described above, the annular body 122 is formed of, for example, polyethylene (PE).

Further, each of the first inclination angle θ21 and the second inclination angle θ22 is preferably 2° or larger and 20° or smaller, more preferably 5° or larger and 18° or smaller, and further preferably 7° or larger and 15° or smaller, for example.

As an example, the first inclination angle θ21 is larger than the second inclination angle θ22.

In order to satisfy the operating condition as described above, as shown in FIG. 13A, for example, the first inclination angle θ21 is set to 20° and the second inclination angle θ22 is set to 10°.

Further, the coefficient of static friction between the annular body 122 and the installation surface 30 is preferably 0.2 or less, more preferably 0.08 or less, and further preferably 0.05 or less, for example. For example, the coefficient of static friction between the annular body 122 and the installation surface 30 is set to 0.08.

In the coating device 120 described above, the same operation and effect can be obtained with the same configuration as the coating device 10 of the first exemplary embodiment.

Further, in the coating device 120, on the inner peripheral surface 122A of the annular body 122, the first inclined surface 123A having the first inclination angle θ21 with respect to the vertical direction is provided on the upper portion side, and the second inclined surface 123B having the second inclination angles θ22 different from the first inclination angle θ21 with respect to the vertical direction is provided on the lower portion side. Therefore, in the coating device 120, for example, in a case of disposing the inclined surfaces of the same length along the up-down direction, the height of the annular body 122 can be lowered compared to a case where the inclined surface has a single inclination angle.

Further, in the coating device 120, each of the first inclination angle θ21 and the second inclination angle θ22 are 2° or larger and 20° or smaller. Therefore, in the coating device 120, the film thickness unevenness of the coating liquid L (the film thickness unevenness of the coated film 102) on the outer peripheral surface 100A of the cylindrical body 100 is suppressed compared to a case where the first inclination angle and the second inclination angle are smaller than 2°. Further, the height of the annular body 122 can be lowered compared to a case where the first inclination angle and the second inclination angle are larger than 20°.

Further, in the coating device 120, the first inclination angle θ21 is larger than the second inclination angle θ22. In this way, the coating liquid L easily enters between the annular body 122 and the cylindrical body 100. Therefore, in the coating device 120, the film thickness unevenness of the coating liquid L (the film thickness unevenness of the coated film 102) on the outer peripheral surface 100A of the cylindrical body 100 is suppressed compared to a case where the first inclination angle is smaller than the second inclination angle.

Supplementary Description

In the first and second exemplary embodiments, the shape of the annular body can be changed, and a configuration may be made in which there is no inclined surface on the inner peripheral surface side of the annular body.

In the first and second exemplary embodiments, the configuration of each member of the coating liquid holding part 12 can be changed as long as the configuration is a configuration capable of applying the coating liquid L to the outer peripheral surface 100A of the cylindrical body 100.

Although the present invention has been described in detail based on exemplary embodiments, the present invention is not limited to such exemplary embodiments, and it will be apparent to the persons skilled in the art that various other embodiments are possible within the scope of the present invention.

EXAMPLES

Hereinafter, the coating device and the coating method of the present disclosure will be more specifically described by way of examples. However, the coating device and the coating method of the present disclosure are not limited to the following examples as long as the gist is not exceeded.

First, as a first example, the coating liquid L is applied to the outer peripheral surface 100A of the cylindrical body 100 while changing the angle of the inclined surface of the annular body with respect to the vertical direction, and the film thickness unevenness of the coated film is evaluated.

Example 1

Creation of Coating Liquid

Preparation of Metal Oxide Fine Particles A 100 parts by weight of zinc oxide (average particle size 70 μm: prototype manufactured by TAYCA Corp.) was agitated and mixed with 450 parts by weight of toluene and 50 parts by weight of methanol, 0.25 parts by weight of silane coupling agent (KBM 603: manufactured by Shin-Etsu Chemical Co., Ltd.) was added, and the mixture was dispersed in a sand grinder mill for 1 hour. Thereafter, toluene was distilled off under reduced pressure, and the mixture was baked at 150° C. for 2 hours, cooled to room temperature, and crushed to obtain surface-treated zinc oxide.

Production of Coating Liquid

After 33 parts by weight of metal oxide fine particles A, 6 parts by weight of blocked isocyanate (Sumidule BL3175, manufactured by Sumitomo Bavarian Urethane Co., Ltd.) and 25 parts by weight of methyl ethyl ketone were mixed for 30 minutes, 5 parts by weight of butyral resin (S-LEC BM-1, manufactured by Sekisui Chemical Co., Ltd.), 3 parts by weight of silicone ball (Tospearl 145, manufactured by Toshiba Silicone Co., Ltd.), and 0.01 part by weight of leveling agent (silicone oil SH29PA, manufactured by Toray Dow Corning Silicone Co., Ltd.) were added to the above mixed liquid, and dispersion treatment was performed for 2 hours in a sand mill to obtain the coating liquid L.

The viscosity of the coating liquid L is 100 mPa s using a "RE500H" type viscometer (manufactured by Toki Sangyo Co., Ltd.) as a viscometer and under the conditions of a standard cone (1° 34'), 25° C., and a shear rate of 100 $s^{-1}$.

Application

Application was performed using an aluminum pipe having ϕ84×340 mm as the cylindrical body 100 and using the coating device shown in FIGS. 1 to 4 or FIGS. 10 to 13 and the coating liquid L described above. The first inclination angle (the first inclination angle θ21 of the first inclined surface) of the annular body is 5°, and the second inclination angle (the second inclination angle θ22 of the second inclined surface) is 2°. Further, the inner diameter of the annular body is 85.0 mm, and the coating liquid L was constantly circulated and supplied to the coating liquid holding part 12 at 0.4 L/min and to the cylindrical body 100 below the upper opening portion 25 at 0.4 L/min. Then, while constantly circulating and supplying the coating liquid L, the upper portion of the inner surface of the cylindrical body 100 was gripped by a grip portion (not shown), and the cylindrical body 100 was caused to penetrate the upper opening portion 25 provided in the coating liquid holding part at a constant speed of 500 mm/min from the vertical upper side. Until the cylindrical body 100 reaches the lowest point, the coating liquid L filled the coating liquid holding part 12 and was in an overflow state.

Next, the cylindrical body 100 was pulled up at a constant speed of 250 mm/min to form the coated film 102 (coating film) on the outer peripheral surface 100A of the cylindrical body 100. During moving up and down of the cylindrical body 100 through the upper opening portion 25, the coating liquid L discharged from the slit-shaped discharge portion 36 provided in the upper opening portion 25 was applied to the entire circumference of the outer peripheral surface 100A of the cylindrical body 100 below the upper opening portion 25, and the coating liquid L flowed down from the outer peripheral surface 100A of the cylindrical body 100 due to gravity. A sample in which the coating liquid L was applied to the cylindrical body 100 (the coated film 102 was formed on the outer peripheral surface 100A of the cylindrical body 100) was dried with hot air at 170° C. for 40 minutes.

Further, the coefficient of static friction between the annular body and the installation surface 30 was set to 0.02. The coefficient of static friction was calculated from the obtained frictional force by using the measurement device shown in FIG. 9.

The film thickness of the coated film was measured using an eddy current film thickness meter and measured by 300 mm at intervals of 20 mm in the axial direction and at intervals of 90° in the circumferential direction from the coating start position, and the difference (range (Max−min)) between the average film thickness and the maximum value and the minimum value of the film thickness was evaluated as film thickness unevenness. Application of the coating liquid to 100 pieces was performed, and the average film thickness of 100 pieces and the average value of the film thickness unevenness were shown in Table 1.

Example 2

Application

The first inclination angle (the first inclination angle θ21 of the first inclined surface, the same applies hereinafter) of the annular body was set to 7°, the second inclination angle (the second inclination angle θ22 of the second inclined surface, the same applies hereinafter) was set to 7°, and the application of the coating liquid L was performed in the same manner as in Example 1. That is, Example 2 is an example in which one inclined surface 33A is formed on the annular body, as shown in FIG. 3, and the angle θ1 of the inclined surface 33A with respect to the vertical direction is 7°.

Example 3

The first inclination angle of the annular body was set to 10°, the second inclination angle was set to 5°, and application of the coating liquid L was performed in the same manner as in Example 1.

Example 4

The first inclination angle of the annular body was set to 20°, the second inclination angle was set to 10°, and application of the coating liquid L was performed in the same manner as in Example 1.

Example 5

The first inclination angle of the annular body was set to 0°, the second inclination angle was set to 0°, and application of the coating liquid L was performed in the same manner as in Example 1. Example 5 is an example in which an inclined surface is not provided on the inner peripheral surface of the annular body.

Example 6

The first inclination angle of the annular body was set to 2°, the second inclination angle was set to 5°, and application of the coating liquid L was performed in the same manner as in Example 1.

Example 7

The first inclination angle of the annular body was set to 10°, the second inclination angle was set to 20°, and application of the coating liquid L was performed in the same manner as in Example 1.

Comparative Example 1

Application of the coating liquid L was performed in the same manner as in Example 1 by using the lower opening portion fixed to the coating liquid holding part without using the annular body (that is, an annular fixing member having no inclined surface is provided in the coating liquid holding part).

Application of the coating liquid to 100 pieces was performed, and the average film thickness of 100 pieces and the average value of the film thickness unevenness were shown in Table 1.

TABLE 1

| | | Annular body | | Number | | Average |
|---|---|---|---|---|---|---|
| | Annular body | First inclination angle (deg) | Second inclination angle (deg) | of coated pieces (piece) | Average film thickness (μm) | film thickness unevenness (μm) |
| Example 1 | With | 5 | 2 | 100 | 22.2 | 0.51 |
| Example 2 | With | 7 | 7 | 100 | 22.5 | 0.65 |
| Example 3 | With | 10 | 5 | 100 | 21.8 | 0.41 |
| Example 4 | With | 20 | 10 | 100 | 22.0 | 0.73 |
| Example 5 | With | 0 | 0 | 100 | 22.1 | 1.3 |
| Example 6 | With | 2 | 5 | 100 | 22.6 | 0.92 |
| Example 7 | With | 10 | 20 | 100 | 21.7 | 1.1 |
| Comparative Example 1 | Without | — | — | 100 | 22.4 | 1.6 |

As shown in Table 1, in Example 1 to Example 4, it was confirmed that the average value of the film thickness unevenness is small. Further, from the results of Example 1 to Example 4 and Example 6 and Example 7, it was confirmed that the film thickness unevenness is small in a case where the first inclination angle (the first inclination angle θ21 of the first inclined surface) of the annular body is larger than the second inclination angle (the second inclination angle θ22 of the second inclined surface) of the annular body. Further, from Example 1 to Example 7 and Comparative Example 1, it was confirmed that the film thickness unevenness is small in a case where the inclined surface was provided on the inner peripheral surface of the annular body.

Next, as a second example, the coating liquid L was applied to the outer peripheral surface 100A of the cylindrical body 100 while changing the coefficient of static friction between the annular body and the installation surface 30, and the film thickness unevenness of the coated film was evaluated.

Example 2-1

The production and preparation of the coating liquid L were the same as in Example 1.

Application

An aluminum pipe having ϕ84×340 mm was used as the cylindrical body, and the first inclination angle (the first inclination angle θ21 of the first inclined surface) of the annular body is 5°, and the second inclination angle (the second inclination angle θ22 of the second inclined surface) is 2°. Polytetrafluoroethylene was used as the member of the installation surface 30 of the annular body, and the coefficient of static friction between the annular body and the installation surface at this time is 0.05. Other conditions were the same as in Example 1.

The film thickness of the coated film was measured using an eddy current film thickness meter and measured by 300 mm at intervals of 20 mm in the axial direction and at intervals of 90° in the circumferential direction from the coating start position, and the difference (range (Max−min)) between the average film thickness and the maximum value and the minimum value of the film thickness was evaluated as film thickness unevenness. Application of the coating liquid to 100 pieces was performed, and the average film thickness of 100 pieces and the average value of the film thickness unevenness were shown in Table 2.

Example 2-2

Application

Application of the coating liquid L was performed in the same manner as in Example 2-1 except that the member of the installation surface 30 of the annular body was made of diamond-like carbon-coated aluminum.

Example 2-3

Application of the coating liquid L was performed in the same manner as in Example 2-1 except that the member of the installation surface 30 of the annular body was made of polyimide resin.

Comparative Example 2-1

Application of the coating liquid L was performed in the same manner as in Example 2-1 except that the member of the installation surface 30 of the annular body was made of SUS316.

Comparative Example 2-2

Application of the coating liquid L was performed in the same manner as in Example 2-1 except that the member of the installation surface 30 of the annular body was made of TiCN-coated SUS316.

Comparative Example 2-3

Application of the coating liquid L was performed in the same manner as in Example 2-1 except that the member of the installation surface 30 of the annular body was made of an aluminum alloy.

Application of the coating liquid to 100 pieces was performed, and the results of evaluating the average film thickness of 100 pieces and the average value of the film thickness unevenness were shown in Table 2.

TABLE 2

| | Annular body | Installation surface of annular body | Coating | Coefficient of static friction | Number of coated pieces (piece) | Average film thickness unevenness (μm) |
|---|---|---|---|---|---|---|
| Example 2-1 | PE | PTFE | Without | 0.05 | 100 | 0.41 |
| Example 2-2 | PE | Aluminum | DLC | 0.08 | 100 | 0.62 |
| Example 2-3 | PE | Polyimide | Without | 0.2 | 100 | 0.8 |
| Comparative Example 2-1 | PE | SUS316 | Without | 0.22 | 100 | 1.2 |
| Comparative Example 2-2 | PE | SUS316 | TiCN | 0.3 | 100 | 1.5 |
| Comparative Example 2-3 | PE | Aluminum | Without | 0.4 | 100 | 1.4 |

As shown in Table 2, it was confirmed that in a case where the coefficient of static friction between the annular body and the installation surface is 0.2 or less, the average value of the film thickness unevenness is small.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A coating device comprising:

a coating liquid holding part, comprising a case, provided with an upper opening and a lower opening and holding a coating liquid that is supplied from a coating liquid supply part comprising a pipe; and an annular body that is disposed inside the coating liquid holding part, wherein the coating device is configured such that a cylindrical body is adapted to penetrate the upper opening and the lower opening of the coating liquid holding part and the cylindrical body is adapted to penetrate the annular body, wherein the coating liquid held by the coating liquid holding part is adapted to flow in from an upper side of the annular body and flow out from a lower side of the annular body based on a relative movement between the annular body and the cylindrical body, wherein the annular body being installed on an installation surface that intersects a direction of the relative movement, the annular body being relatively displaceable along the installation surface that intersects the direction of the relative movement, wherein the annular body is configured to be relatively displaceable with respect to the upper opening and the lower opening of the coating liquid holding part.

2. The coating device according to claim 1, wherein a coefficient of static friction between the annular body and the installation surface is 0.2 or less, wherein the coefficient of static friction is defined as a maximum friction force that is applicable to the annular body without the annular body moving relative to the installation surface, divided by a normal force of the annular body with respect to the installation surface.

3. The coating device according to claim 2, wherein the coefficient of static friction between the annular body and the installation surface is 0.08 or less.

4. The coating device according to claim 3, wherein the coefficient of static friction between the annular body and the installation surface is 0.05 or less.

5. The coating device according to claim 1, wherein an inclined surface having a downward slope from a position where the coating liquid held by the coating liquid holding part flows in is provided on an inner surface of the annular body.

6. The coating device according to claim 5, wherein an angle of the inclined surface with respect to a vertical direction is 2° or larger and 20° or smaller.

7. The coating device according to claim 5, wherein the inclined surface has a first inclined surface disposed on an upper side and having a first inclination angle with respect to a vertical direction, and a second inclined surface disposed on a lower side of the first inclined surface and having a second inclination angle different from the first inclination angle with respect to the vertical direction.

8. The coating device according to claim 7, wherein each of the first inclination angle and the second inclination angle is 2° or larger and 20° or smaller.

9. The coating device according to claim 7, wherein each of the first inclination angle and the second inclination angle is 5° or larger and 18° or smaller.

10. The coating device according to claim 7, wherein each of the first inclination angle and the second inclination angle is 7° or larger and 15° or smaller.

11. The coating device according to claim 7, wherein the first inclination angle is larger than the second inclination angle.

12. A coating method of applying a coating liquid by using the coating device according to claim 1, the coating method comprising:

causing the cylindrical body to penetrate the upper opening portion and the lower opening portion of the coating liquid holding part and penetrate the annular body, and disposing an upper portion of the cylindrical body at a position facing the coating liquid holding part;

supplying the coating liquid from the coating liquid supply part to the coating liquid holding part; and relatively moving the cylindrical body upward in an up-down direction with respect to the coating liquid holding part, causing the coating liquid held by the coating liquid holding part to flow in from an upper side and flow out from a lower side between the annular body and the cylindrical body, and relatively displacing the annular body along the installation surface.

13. The coating method according to claim 12, wherein the cylindrical body is a cylindrical member or a member obtained by winding an endless belt-shaped member around a cylindrical core material.

14. A method for manufacturing a photoconductor comprising using the coating method according to claim 12, wherein the cylindrical body is a cylindrical member made of metal or a member obtained by winding an endless belt-shaped member made of metal around a cylindrical core material, and the coating liquid contains a photosensitive material.

* * * * *